(No Model.)

H. F. DUNN.
CLEVIS.

No. 334,760. Patented Jan. 26, 1886.

WITNESSES
C. W. Dashiell
E. G. Siggers

INVENTOR
Henry F. Dunn
By C. A. Snow & Co.
Attorneys

United States Patent Office.

HENRY FRANKLING DUNN, OF EAGLE LAKE, TEXAS.

CLEVIS.

SPECIFICATION forming part of Letters Patent No. 334,760, dated January 26, 1886

Application filed April 15, 1885. Renewed December 14, 1885. Serial No. 185,666. (No model.)

*To all whom it may concern:*

Be it known that I, HENRY F. DUNN, a citizen of the United States, residing at Eagle Lake, in the county of Colorado and State of Texas, have invented a new and useful Improvement in Clevises, of which the following is a specification, reference being had to the accompanying drawings.

My invention relates to a clevis, and is designed particularly for use upon plows.

The object of the invention is to provide a clevis with a series of attaching-loops whereby the line of draft may be changed as circumstances may require, to bring the line of draft to either side of the plow-beam, or above or below the same, and to provide a clevis with a centrally-located attaching-loop, to be used where a direct or central draft is desired.

A further object of the invention is to provide a clevis which may be readily and easily attached to plows now in use—one that will be simple in its construction, effective in its operation, and strong and durable.

With these ends in view the invention consists in the combination, with a plow-beam, of a series of attaching-loops and an attaching-loop swiveled thereto.

The invention further consists in certain details of construction, and in the combination, of parts hereinafter fully described, and pointed out in the claim.

Figure 1:
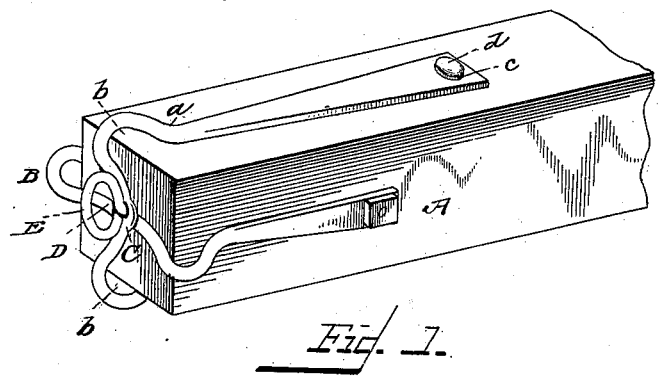
Figure 2:
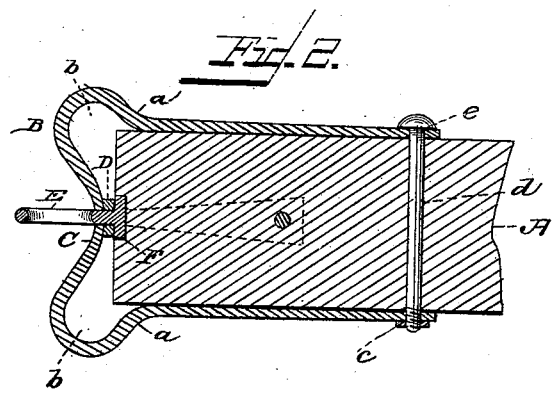
Figure 3:
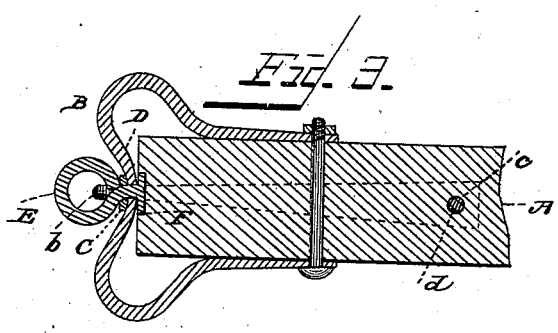

In the drawings, Figure 1 is a perspective view of a clevis constructed in accordance with my invention. Fig. 2 is a longitudinal vertical section of the same. Fig. 3 is a horizontal section.

In the accompanying drawings, in which like letters of reference indicate corresponding parts in all the figures, A represents the plow-beam, which is of the ordinary construction.

B represents the clevis, which consists of the plate C, which is doubled or bent upon itself, and said doubled end is bent outwardly on each side, as at, $a$, to form attaching-loops $b$, which, as will be seen, extend beyond the sides of the beam A. The ends of said plate C are provided with holes or openings $c$, for the passage of a securing-bolt, $d$, which passes through an opening in the beam and connects the ends of the said plate. It will be seen that by attaching the single-tree to either one of the loops $b$ a side draft is obtained.

D represents a plate, which is bent in the same manner as the plate C, already described, but is secured to the plow-beam, so as to intersect the plate fitting in the space between the loops thereof.

The plates C and D at their point of intersection are provided with registering holes or openings, in which is seated the end of a loop, E, and upon said end of the loop E which extends through said openings is a disk, F, which is located in a circular recess formed in the end of the plow-beam. The said swiveled loop E is adapted to be connected with the single-tree when a central draft is desired; but if a deep furrow is desired the single-tree is attached to the upper of the loops of the plate D, while if a shallow furrow is desired the single-tree is attached to the lower of the loops of the plate D.

The clevis before described is simple in its construction, readily and easily applied, may be manufactured at a slight cost, is effective in its operation, and strong and durable.

Having fully described my invention, what I claim as new, and desire to secure by Letters Patent, is—

The combination, with a plow-beam, of the clevis-plates bent or doubled and formed with attaching-loops, said plates intersecting each other and formed with registering holes or openings, and a loop having its end extending through said openings and held in place by a disk, substantially as set forth.

In testimony that I claim the foregoing as my own I have hereto affixed my signature in presence of two witnesses.

HENRY FRANKLING DUNN.

Witnesses:
JOS. T. PHILLIPS,
I. A. HARRIS.